United States Patent
Sweeny

[15] 3,699,843
[45] Oct. 24, 1972

[54] TOOL HAVING RESILIENT BUMPER

[72] Inventor: Allen N. Sweeny, Grosse Pointe Farms, Mich.

[73] Assignee: Devlieg Machine Company, Royal Oak, Mich.

[22] Filed: Jan. 20, 1971

[21] Appl. No.: 108,063

[52] U.S. Cl. .................90/11 A, 408/226, 279/1 ME, 29/95
[51] Int. Cl. .........................................B23b 27/00
[58] Field of Search....279/1 ME, 1 Q; 408/143, 226; 90/11 A; 29/95

[56]  References Cited

UNITED STATES PATENTS

| | | |
|---|---|---|
| 2,606,366 | 8/1952 | Stevens.....................408/143 |
| 3,563,560 | 2/1971 | Johnson.........................408/1 |
| 3,463,048 | 8/1969 | Owsen.......................90/11 A |

Primary Examiner—Francis S. Husar
Attorney—Harness, Dickey & Pierce

[57]  ABSTRACT

A tool or tool holder having a shank which is received in the socket of a machine tool spindle or other tool carrier. A resilient bumper ring is fitted on the rear end of the shank to protect both the shank and the socket from damage. In one embodiment of the invention the bumper also serves as a wiper to clean the socket.

5 Claims, 5 Drawing Figures

PATENTED OCT 24 1972　　　　　　　　　　　3,699,843
SHEET 1 OF 2
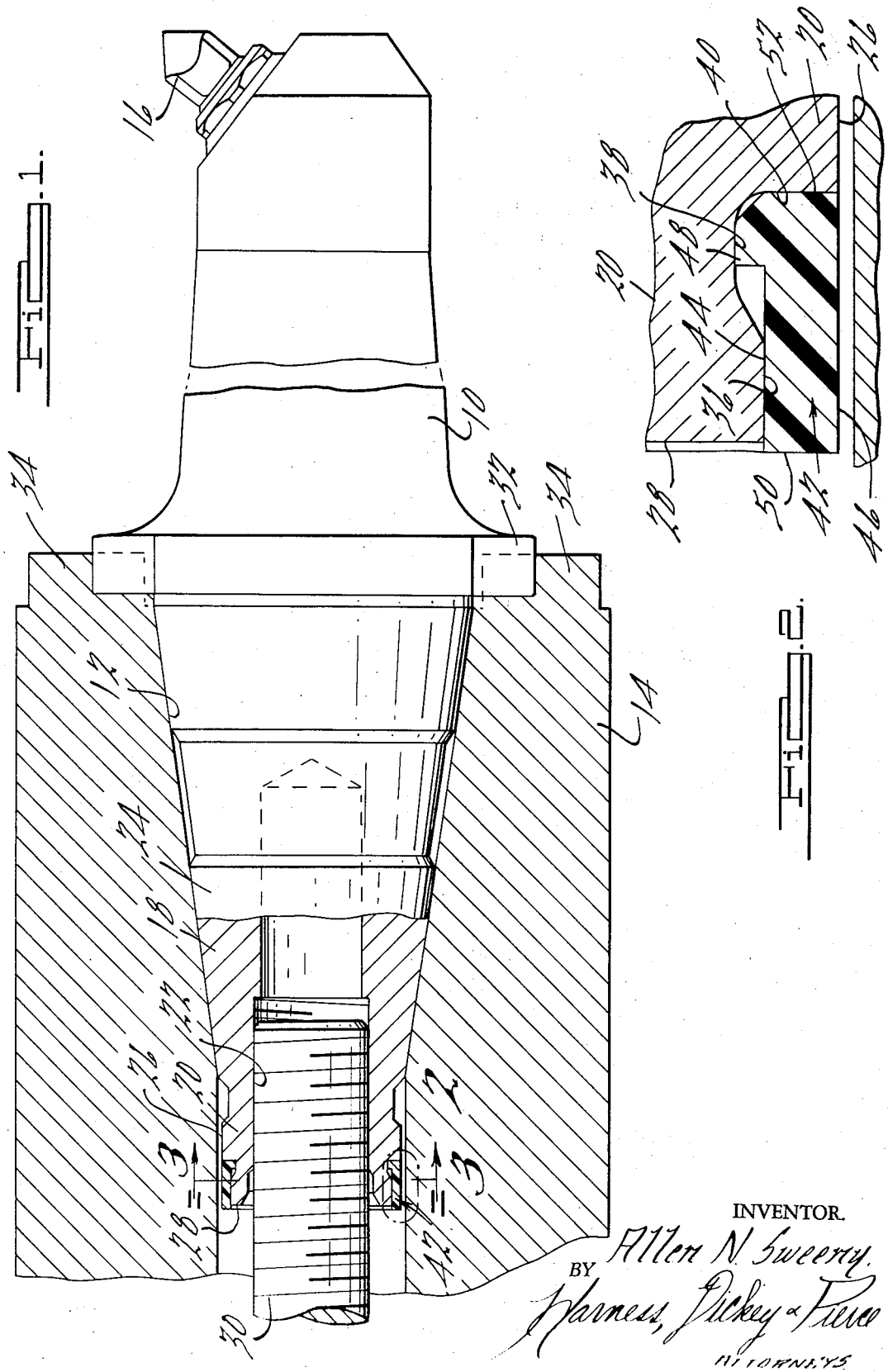
INVENTOR.
Allen N. Sweeny
BY Harness, Dickey & Pierce
ATTORNEYS

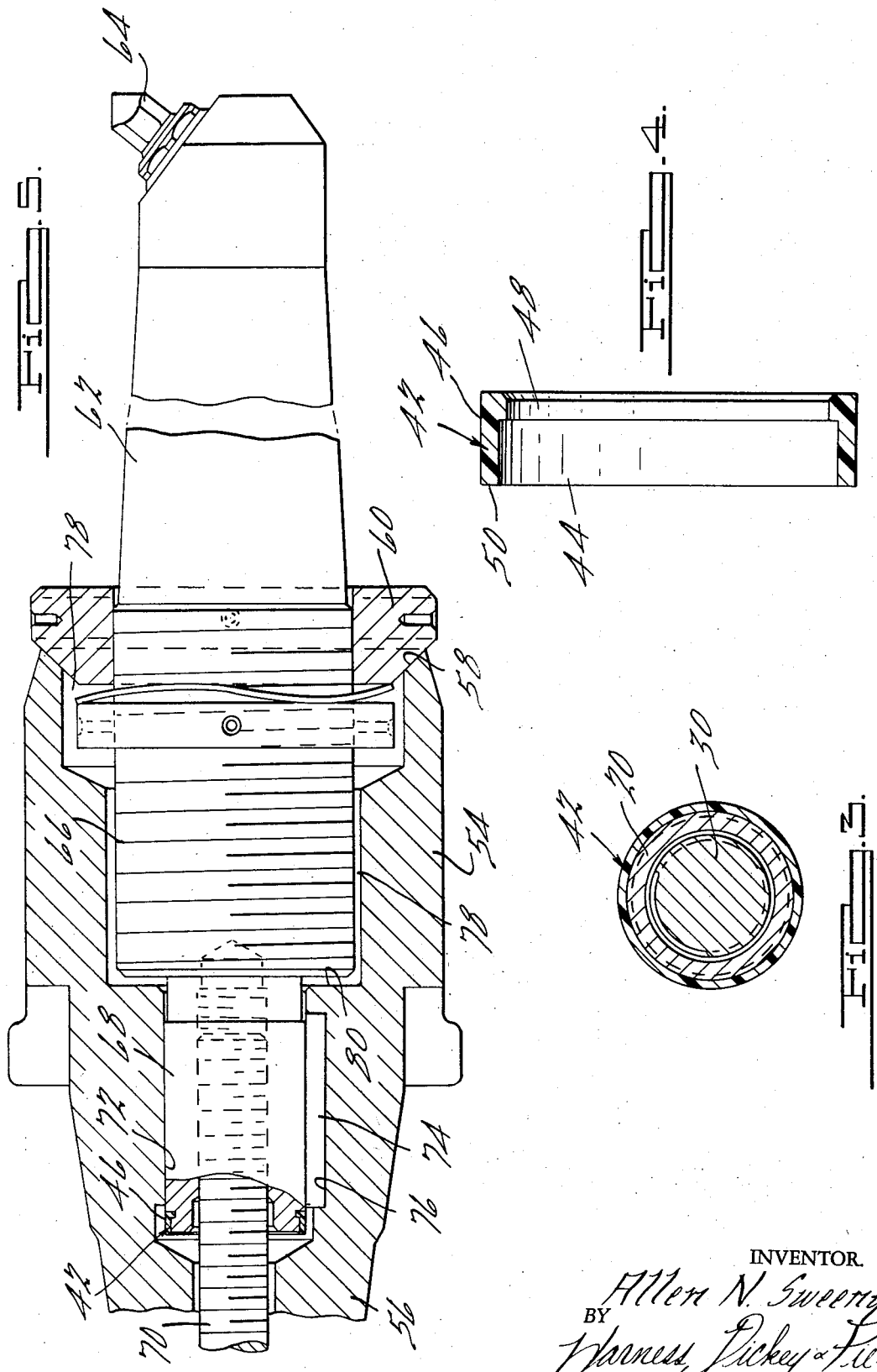

TOOL HAVING RESILIENT BUMPER

SUMMARY OF THE INVENTION

The tools or tool holders which support the cutters used on boring, drilling, milling and similar machining operations are customarily fabricated from steel. During the insertion of the tool in the socket of the machine drive spindle or other tool carrier, care must be exercised to prevent damage to the socket or the tool shank. When relatively heavy tools are being handled or when the tools are handled by automated tool changing equipment, the possibility of damage to the parts is increased.

The present invention is characterized by the provision of a solid metallic tool shank having a resilient bumper ring fitted over a projection on the rear end thereof. The ring has an inturned lip which engages a circumferential groove in the periphery of the shank projection. The bumper ring prevents damage to the tool and/or socket as a result of the shank striking the wall of the socket during insertion or removal of the tool.

It is an object of the present invention to provide a tool having a protective bumper on its shank which is highly effective for the aforesaid damage preventing function, which is easily assembled, which is secure against accidental dislodgment of the bumper ring and which can be manufactured at a cost only slightly greater than a tool having a one piece solid metal shank.

It is a further object of the present invention to provide a tool shank having a protective bumper ring in which the tool shank serves the additional function of cleaning a bore in which a portion of the tool shank is received.

DESCRIPTION OF THE VIEWS OF THE DRAWINGS

FIG. 1 is a view partly in section and partly in elevation of a tool constructed in accordance with the present invention, the tool being shown positioned within a fragmentarily illustrated machine tool spindle;

FIG. 2 is an enlarged sectional view of the structure shown within the circle 2 of FIG. 1;

FIG. 3 is a sectional view of the structure illustrated in FIG. 1 taken along the line 3—3 thereof;

FIG. 4 is an enlarged sectional view of the bumper ring shown in FIGS. 1 to 3; and FIG. 5 is a view of structure similarly illustrated in FIG. 1, showing a modified form of the invention.

DESCRIPTION OF THE ILLUSTRATED EMBODIMENTS OF THE INVENTION

Referring now to FIG. 1, a steel boring bar 10 is shown positioned within the socket 12 of a machine tool spindle 14. The boring bar 10 carries a cutter 16 at its forward end and is provided with a tapered shank 18 at its rear end. A generally cylindrical projection 20 extends rearwardly from the tapered shank 18 and has an axially extending tapped bore 22 open to the rear end 28 thereof. It will be seen that the tapered shank 18 has a frusto-conical outer peripheral surface 24 while the rearwardly extending projection 20 has a circular cylindrical outer peripheral surface 26. A conventional spindle draw bolt 30 is shown threaded into the bore 22. A radial flange 32 is formed on the body 10 immediately in front of the shank 18 for engagement with drive keys 34 formed on the spindle 14.

The invention, as embodied in the construction of FIGS. 1-4, is particularly concerned with the portion of the tool in the area of the projection 20. The projection 20 has a reduced diameter cylindrical surface 36 adjacent its rear end 28 (see FIG. 2). An annular groove 38 is formed at the forward end of the surface 36 adjacent an annular shoulder 40. The shoulder 40 defines one end of the groove 38 and extends radially outwardly therefrom to the cylindrical surface 26. The cylindrical surface 36, the groove 38 and the shoulder 40 are engaged by and locate a bumper ring 42.

The bumper ring 42 has circular cylindrical inner and outer surfaces 44 and 46, respectively. An annular lip 48 projects radially inwardly from the front end of the inner cylindrical surface 44. The lip 48 has a radial dimension equal to the depth of the groove 38 and seats fully in said groove. The axial length of the lip is somewhat less than the axial length of the groove 38. The bumper 42 has an annular rear end surface 50 which lies in a plane slightly to the rear of the plane of the end 28 of the projection 20. A front end surface 52 of the ring 42 flatly engages the shoulder 40. It will be seen that the outer cylindrical surface 46 of the ring is disposed in axial alignment with the surface 26 of the projection 20 and constitutes a smooth continuation thereof. The inner cylindrical surface 44 of the ring conformably engages the surface 36 of the projection 20.

The bumper ring 42 is made from a non-metallic resilient material. Bumper rings 42 made from molded polyurethane having a 95 durometer hardness have been found to perform well. The inner cylindrical surface 44 of the bumper ring 42 is desirably made of a diameter smaller than the diameter of the cylindrical surface 36 of the projection 20. A difference of 0.020 inch, for example, has been found to work well. Similarly, the inner diameter of the lip 48 is made about 0.015 to 0.020 smaller than the diameter of the bottom of the groove 38. Thus, upon assembly of the bumper ring 42 onto the projection 20 the lip 48 is stretched over the surface 36 to enter the groove 38 and the main portion of the bumper ring will be stretched onto the surface 36. Due to the elasticity of the material of the bumper ring, the ring will grip the surface 36 and its lip 48 will tightly grip the bottom of the groove 38. The ring 48 is thereby held securely in place. It will be noted that the rear end surface 50 of the bumper ring 42 projects slightly to the rear of the rear end surface 28 of the projection 20. This is desirable to protect the rear end surface 28 of the projection 20.

In the manufacture of the tool of the present invention the bumper ring 42 is first assembled onto the projection 20. Thereafter the tool is subjected to a grinding operation in which the outer cylindrical surface 46 of the bumper ring 42 and the cylindrical surface 26 of the projection 20 are ground together to assure the exact alignment of such surfaces.

A slightly modified form of the invention is illustrated in FIG. 5. This form of the invention includes a tool holder 54 having a tapered shank 56 adapted to be received in a machine tool spindle (not shown). The forward end of the tool holder 54 is provided with an annular conical seat 58 against which an internally threaded adjusting collar 60 is positioned. A boring bar 62 carrying a cutter 64 is supported by the tool holder 54 with a threaded portion 66 thereof threaded through the adjusting collar 60. A cylindrical projection 68 projects rearwardly from the thread 66 and is engaged by a locking screw 70. The rear end of the projection 68 is fitted with the same molded polyurethane bumper ring 42 which was utilized in the prior embodiment of the invention. The cylindrical outer peripheral surface 46 of the bumper ring 42 forms a smooth continuation of the cylindrical outer peripheral surface of the projection 68. It will be seen that the projection 68 is fitted within a cylindrical bore 72 of the tool holder 54. Thus, when the tool 62 is inserted into the tool holder 54 the bumper ring 42 passes through the bore 72. In so doing it wipes the bore 72 clean of dirt and other contaminates to assure a proper fit between the projection 68 and the bore. The projection 68 carries a key 74 received in a keyway 76 of the bore 72. The bore 72 communicates with a stepped opening 78 at the forward end of the tool holder 54. An annular shoulder 80 is located between the stepped opening 78 and the bore 72. Should the tool 62 not be properly aligned upon its insertion into the tool holder 54 the bumper ring will strike the annular shoulder 80. However the bumper ring 42 cushions the impact and prevents damage to the parts.

As used in the following claims, the expression "tool carrier" is meant to include a machine tool spindle, tool holder, or other device in which a tool or tool holder shank is inserted. The word "tool" is meant to include tool holders or the like as well as bodies having cutters mounted directly thereon.

What is claimed is:

1. A rotary metal cutting tool having a shank adapted to be removably seated in the socket of a drive spindle or the like, said shank having a conical surface matingly engageable with a fixed conical wall of the driving spindle to locate the tool relative to the spindle, said shank further having an integral rearwardly extending metallic projection spaced radially inwardly from the adjacent wall of the socket when the tool is seated in the drive spindle socket, said projection having a circumferentially extending groove therein which is spaced forwardly from the rear end of said projection and is located rearwardly of said conical surface and a resilient bumper ring fitted over said projection and having a radially inwardly projecting lip disposed in said groove to hold said bumper ring on said projection.

2. The structure set forth in claim 1 in which said bumper ring has a cylindrical outer peripheral surface comprising a smooth extension of an outer peripheral surface of said projection.

3. The structure set forth in claim 1 in which said tool shank is made from steel and in which said bumper ring is made from a resinous plastic material.

4. The structure set forth in claim 1 in which said bumper ring projects rearwardly of the rear end of said projection.

5. The structure set forth in claim 1 in which said projection is possessed of a generally circular cylindrical outer peripheral shape.

* * * * *